United States Patent

Grotyohann

[15] 3,662,605
[45] May 16, 1972

[54] METHOD AND MEANS FOR AUTOMATING COMPUTER-CONTROLLED PRODUCTION OF PARTICULATE MATERIALS

[72] Inventor: Arthur G. Grotyohann, Lincroft, N.J.
[73] Assignee: N. L. Industries, Inc., New York, N.Y.
[22] Filed: May 13, 1970
[21] Appl. No.: 36,918

[52] U.S. Cl. .................................73/421.5 R, 73/432 PS
[51] Int. Cl. .........................................................G01n 1/24
[58] Field of Search...........................73/421.5 R, 432 PS, 28

[56] References Cited

UNITED STATES PATENTS

| | | | |
|---|---|---|---|
| 3,478,600 | 11/1969 | Lynn | 73/432 PS |
| 3,517,557 | 6/1970 | Granger et al. | 73/421.5 |
| 3,519,353 | 7/1970 | Franz et al. | 73/432 PS X |

Primary Examiner—Louis R. Prince
Assistant Examiner—William A. Henry
Attorney—Charles F. Kaegebehn, Robert L. Lehman, Harold L. Gammons and Robert L. Holiday

[57] ABSTRACT

The particle size and particle size distribution of the particulate $TiO_2$ solids in a solids burdened reaction product gas produced in a vapor phase process for making pyrogenic $TiO_2$ are measured by diluting a sample of the solids burdened gas by an order of magnitude of at least about $10^{12}$ and feeding the diluted sample to measuring-means in the form of a multichannel light scattering sensor the read-out of which constantly measures the particle size and particle size distribution of the particulate solids in the reaction product gases being produced. It is, of course, well known that particle size and particle size distribution of particulate $TiO_2$ particles may be correlated with the optical properties of the pigment. Hence the read-out of the light scattering sensor will be indicative of the quality of $TiO_2$ pigment being produced and may be usedd manually i.e. visual observation or by electronic means to effect adjustments in the appropriate plant operational controls so as to maintain the optical properties of the pigment substantially constant and at optimum levels throughout a plant run.

15 Claims, 1 Drawing Figure

INVENTOR
A. G. Grotyohann

BY H. L. Gammons
AGENT

3,662,605

METHOD AND MEANS FOR AUTOMATING COMPUTER-CONTROLLED PRODUCTION OF PARTICULATE MATERIALS

BACKGROUND OF THE INVENTION

With the steady increase in demand for metal oxide pigments and in particular pyrogenic $TiO_2$ pigment made by the so-called chloride process many manufacturers of $TiO_2$ pigment are building new chloride plants and/or increasing their present production capacity by expansion of existing facilities. While the chemistry of chloride-base $TiO_2$ pigment is relatively simple, experience over the past twenty years has demonstrated that a process for producing chloride-base $TiO_2$ pigment economically on a commercial scale is made extremely complex by the many controls involved in reacting vaporous $TiCl_4$ with oxygen to produce $TiO_2$ pigment having satisfactory pigmentary properties. AS a consequence some of the more progressive manufacturers have gone to automation including the use of computers, whereby temperatures, pressures, flow rates and other parameters are automatically controlled. However despite this, it is still the practice to determine the quality of the pigment being produced during any time increment by conventional testing methods as for example, by manually removing a sample of the pigment from the reactor, adding it to a suitable vehicle and carrying out the usual tests for tinting strength, spectral characteristics, oil absorption, and the like. As a consequence an intolerable length of time may elapse between the time the quality of the pigment is determined and the plant process controls are readjusted to correct for poor pigment quality.

SUMMARY OF THE INVENTION

Based on the fact that the particle size and particle size distribution of pigmentary $TiO_2$ can be correlated with its optical properties the present invention relates to the discovery of a method and means for continuously measuring the particle size and particle size distribution of pigmentary $TiO_2$ being produced in the vapor phase process for producing pyrogenic $TiO_2$, the invention being characterized by continuously withdrawing a sample of the $TiO_2$ burdened reaction product gases being discharged from the reactor, diluting the gases in a series of steps to effect a dilution by an order of magnitude of at least about $10^{12}$ and feeding the highly dilute gases into a multi-channel light scattering sensor in which the particle size and particle size distribution of the particulate $TiO_2$ in the gas is measured and visually recorded. To an operator skilled in correlating particle size and particle size distribution with pigment quality the read-out of the light scattering sensor will provide a constant record of pigment quality and may be used by the operator to effect changes in the appropriate plant operational controls for monitoring optimum pigmentary properties. The invention also contemplates utilizing the readings of the light scattering sensor visually or by electronic means to make the appropriate adjustments in a computer used to automatically actuate the plant operational controls whereby the appropriate adjustments are made automatically in response to the read-out of the light scattering sensor.

DESCRIPTION OF THE DRAWING

The FIGURE is a schematic view of the apparatus for continuously producing dilute samples of solids-burdened reaction product gases.

DESCRIPTION OF PREFERRED EMBODIMENT

Figure 1:
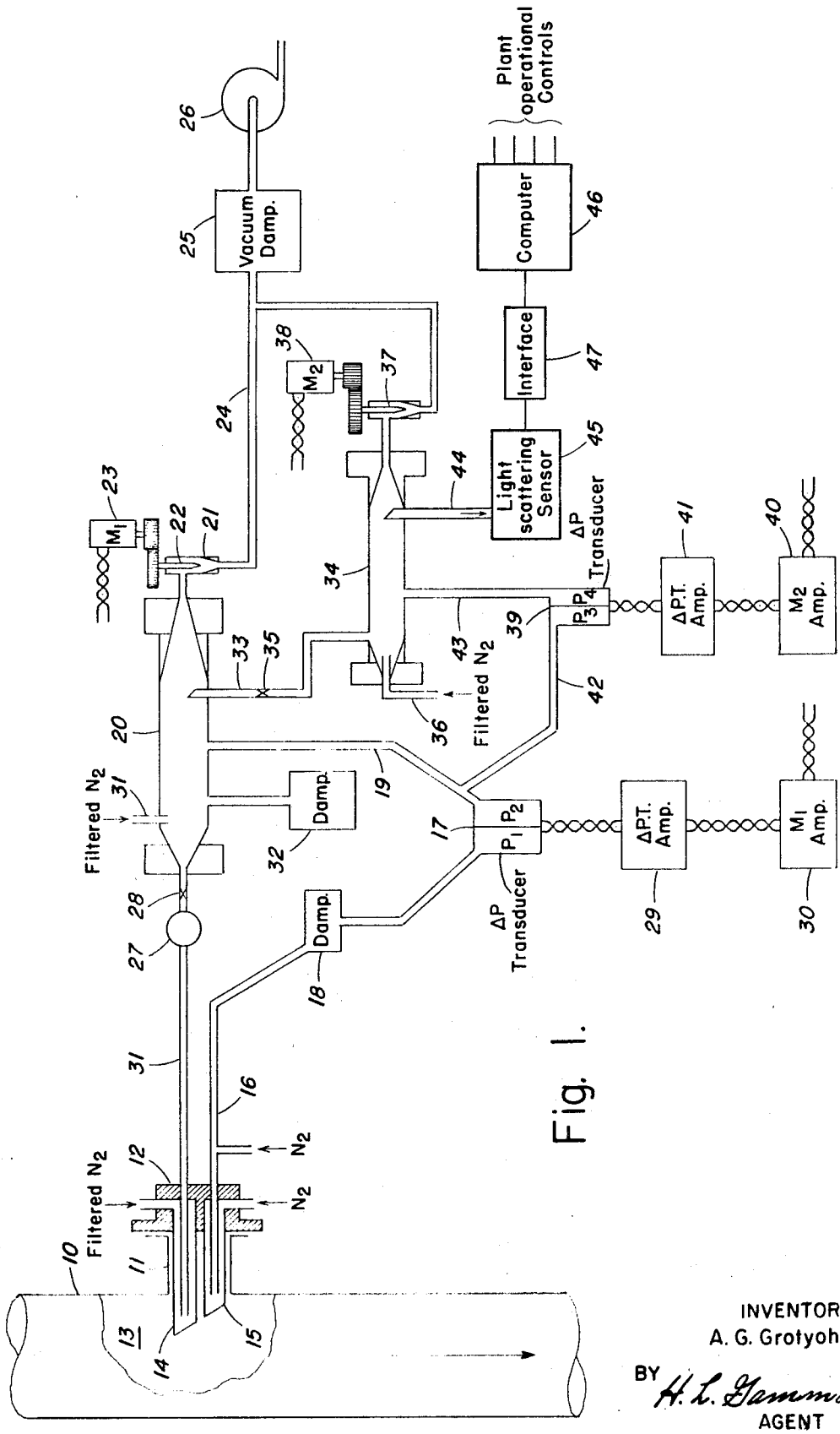

The preferred embodiment of the invention is illustrated in the FIGURE and while the description which follows is directed specifically to the preferred embodiment as used in the production of pyrogenic $TiO_2$ pigment it will be understood that the invention is adaptable to other commercial operations wherein it is important to maintain constant surveillance of the particle size and particle size distribution of a particulate material in a gas stream.

In general, pyrogenic $TiO_2$ is produced by reacting vaporous $TiCl_4$ with oxygen or an oxygen containing gas, at elevated temperatures and usually in the presence of a gaseous metal halide such as aluminum chloride. The reaction may take place in the presence of a fluidized bed of inert material; or the reaction may take place in the free space of a tubular reaction chamber in a manner to produce a stream of intimately mixed gases wherein the particulate $TiO_2$ is formed in finely divided form. In this case substantially all of the particulate $TiO_2$ in suspension in the gas stream is carried out of the reactor via a reactor duct from which the particulate $TiO_2$ may be recovered either by a wet or dry recovery system.

Pursuant to the objects of the invention a sample portion of the $TiO_2$ burdened reaction product gases is continuously removed from the reactor duct and the particle size and particle size distribution of the particulate $TiO_2$ are continuously measured using a light scattering sensor. The accuracy of these measurements is dependent however upon several factors including withdrawing a sample portion of the $TiO_2$ burdened product gases from the reactor duct at a steady uniform rate and effecting an extremely high dilution of the sample gases prior to entering the light scattering sensor.

With respect to the former criterion experience has shown that while the mean operating pressure in the vapor phase reactor duct may be approximately 6 inches of water negative with mean amplitude variations of about ± 2 inches of water pressure, much higher variations have been encountered during a continuous run. Hence to satisfy the first criterion the present invention embodies suitable means for minimizing irregularities in the flow rate of the gas sample during normal operation of the reactor.

With respect to the need for diluting the particulate solids burdened samples earlier experience in correlating the particle size and particle size distribution of particulate $TiO_2$ with its pigmentary properties demonstrated the need for a measurement span of at least eight units, i.e. from 0.1 micron to 0.9 microns. While the particle size analyzers of this capability are available commercially, notably those used in "clean rooms" for monitoring the particulate material in the air, these instruments are designed to handle extremely dilute samples of air, i.e. samples having no more than $10^6$ solid particles per cubic foot gas. In contradistinction the concentration of particulate $TiO_2$ in the reactor product gases of a vapor phase reactor is generally about $3 \times 10^{17}$ or higher particles $TiO_2$ per cubic foot gas. Hence to meet the second criterion the present invention embodies suitable means for diluting the reaction product gases by an order of magnitude of at least $10^{12}$ whereby the particle size and particle size distribution of the particulate $TiO_2$ may be measured using commercially available equipment.

Turning now to the schematic drawing, the reactor duct is indicated at 10 and comprises a substantially vertical pipe through which the $TiO_2$ burdened reaction product gases flow downwardly continuously, usually at fluctuating rates, into suitable collecting means (not shown). A sample of these gases is adapted to be removed continuously from the duct 10 and to this end an opening is made in the wall of the duct in which is secured a flanged sleeve 11 extending substantially at right angles thereto. A flanged cap 12 formed of heat resistant material, as for example a ceramic or refractory material is suitably secured to the outer face of the flange of sleeve 11 and serves to support a sampling probe 13 and associated elements for continuously withdrawing a sample of the reaction product gas from the duct 10. Included among the elements associated with the sampling probe 13 are feed pipes 14 and 15 mounted one above the other in the cap 12 and in a manner to extend through the sleeve 11 into the duct 10. The upper feed pipe 14 extends into the duct 10 beyond the feed pipe 15 and the inner end of each feed pipe is bevelled downwardly and outwardly as shown so as to minimize deposition of pigmentary $TiO_2$ thereon from the downwardly flowing reaction product gases. The opposite or outer end of each feed pipe is provided with an elbowed extension each of which projects outside the cap 12 in a manner to provide a nipple for making an attachment thereto. Since the feed pipes 14 and 15 are subjected to the extremely high temperatures encountered in the reactor duct 10 each is made of a refractory heat-resistant material. The nipple of each feed pipe is adapted to be attached to a source (not shown) of inert gas such as nitrogen which is fed into the feed pipes at a predetermined rate; and issues therefrom within the reactor duct 10 in the form of a cloud of nitrogen surrounding the inner ends of the feed pipes 14 and 15. This cloud of nitrogen is designed to serve as a diluent of the reaction product gases entering the gas sampling probe 13 and hence is sometimes referred to hereinafter as the first-order dilution of the reaction product gases.

The sampling probe 13 is an elongated hollow needle-like member which extends through an aperture in the flanged cap 12 and into the feed pipe 14 substantially coaxial therewith and terminates just short of the bevelled inner end thereof. As the name implies the tube 13 is adapted to withdraw a sample of the solids burdened reaction product gas continuously from the reactor duct 10 via a cloud of nitrogen which surrounds the inner ends of the feed pipes 14 and 15. Since the accuracy of the measurements made by the light scattering sensor reflect the purity of the particulate material being measured it is essential that the dilute sample of gas withdrawn from the reactor duct be substantially free of impurities and hence it is preferred that the nitrogen fed into the feed pipe 14 for forming the cloud of nitrogen around the entrance end of the sampling probe 13, be filtered nitrogen.

Supported by the cap 12 directly below the sampling tube 13 is a pressure sensing tube 16 the function of which is to continuously sense the pressure (negative or positive) in the reactor duct 10, as and for the purpose hereafter described. To this end the pressure sensing tube 16 comprises a hollow needle-like member which, as shown in the drawing extends into the feed tube 15 coaxial therewith and terminates short of its bevelled inner end.

In as much as there is usually negative pressure within the reactor duct 10 positive pressure, relative to that in the duct 10, is maintained in the pressure sensing tube 16 by feeding nitrogen or other inert gas into tube 16 via a T-connection to a gas source (not shown). The relative positive pressure maintained within the pressure sensing tube 16 acts on one leg of a differential pressure transducer 17. Now, as pointed out above, the pressure in the reactor duct 10 is not only negative but variable and normally these variations in negative pressure would be transmitted by the pressure sensing tube 16 to the transducer 17 with deleterious results. Hence the sensing tube 16 is provided with damping means in the form of a sealed chamber 18 located between the differential pressure transducer 17 and the T-connection to the gas source. The chamber 18 is preferably packed with mineral wool or other equivalent means to effectively dampen out pressure fluctuations in the pressure sensing tube 16. The other leg of the differential pressure transducer 17 is connected by pipe 19 to one of two sample dilution chambers the function of each being to effect further dilution of the gas sample withdrawn from the reactor duct 10. Although two such chambers are shown in the present embodiment of the invention it will be understood that one chamber or more than two may be used depending upon dilution requirements. The first of these sample dilution chambers is indicated at 20 and comprises a cylinder having conical front and rear walls. The sampling probe 13 is adapted to be secured with a fluid tight fit in a central aperture in the conical front wall of the chamber 20. The conical rear wall of the chamber has a tubular extension connected to the cylinder 21 of a needle valve 22 adapted to be operated by an electrically energized servo-motor 23. The valve cylinder 21 is connected by pipeline 24 to a vacuum expansion tank 25 which in turn is connected to vacuum pump 26 for effecting negative pressure within chamber 20. With reference again to the sampling probe 13 the latter is provided with a quarter-turn ball valve 27 and a restricting orifice 28 the latter being located in the sampling tube 13 between the valve 27 and the forward end of the first dilution chamber 20. Should the need arise the valve 27 may be used to shut off the flow of the sample gas from the reactor duct 10 to the first dilution chamber; while the orifice 28 serves to restrict the volume of sample gas entering the first dilution chamber. In this connection a gas sample is withdrawn from the reactor duct 10 and made to enter the first dilution chamber by reason of a constant predetermined pressure differential between the pressure in the first dilution chamber 20 and the pressure in the reactor duct 10 and to this end one leg of the differential pressure transducer 17 is connected to a reactor duct 10 via the pressure sensing tube 16 so as to respond to changes therein while the second leg 18 of the differential pressure transducer 17 is connected via pipe 19 into the first dilution chamber 20.

The differential pressure transducer 17 is connected, in turn, through amplifiers 29 and 30 to the servo-drive motor 23 which operates the needle valve 22 in vacuum line 24. Thus any changes in negative pressure in reactor duct 10 that would upset the constant predetermined pressure differential used to pull a gas sample from the duct 10 into the first dilution chamber is immediately detected by the differential pressure transducer which instantly opens or closes the needle valve in the vacuum line 24, as circumstances require, to effect an adjustment of the negative pressure within the first dilution chamber thereby holding the predetermined pressure differential constant.

The gas sample drwan into the first dilution chamber 20 has already suffered a first-order dilution due to the passage through the cloud of nitrogen in duct 10. This diluted gas sample is further diluted by blending with additional inert gas i.e. filtered nitrogen which is fed into the first dilution chamber 20 via feed pipe 31. Directly connected to the first dilution chamber 20 is a damping chamber 32 designed to dampen any fluctuations in flow gases into the first dilution chamber. In the preferred embodiment shown herein filtered nitrogen is fed into the first dilution chamber at a rate such that the ratio of the volume of nitrogen to the volume of sample gas in the first dilution chamber effects a second-order dilution of about $10^7$.

Having effected a second-order dilution of the gas sample in the first dilution chamber further dilution is effected by withdrawing a sample of the twice diluted gas from the first dilution chamber 20 via sampling tube 33 and diluting it in a second dilution chamber 34 to this end sampling tube 33 is provided with a restricting orifice 35 for restricting the volume of the gas sample entering the second dilution chamber 34. The latter is connected to a vacuum pump 26 by a servo-drive motor operated needle-valve 37 and pipe-line assembly the servo-motor 38 of which is connected to a second differential pressure transducer 39 by motor amplifier 40 and transducer amplifier 41. As with the first dilution chamber 20 a constant predetermined pressure differential is used to withdraw a sample of gas from the first dilution chamber 20 into the second dilution chamber 34, and in order to compensate for any changes in negative pressure within the first dilution chamber a pressure sensing tube 42 is connected to the pressure sensing tube 19 of the first dilution chamber 20 and to one leg of the second pressure differential transducer 39 the other leg of which is connected by pressure sensing tube 43 to the second dilution chamber 34. The second dilution chamber 34 also includes feed pipe 30 for feeding nitrogen or an equivalent inert gas into the second chamber at a rate such as to effect a third-order dilution of at least $10^5$. As a consequence of this third-order dilution the original gas sample is diluted by an order of magnitude of at least $10^{13}$ and hence is ideally suited for particle size measurement by a light scattering sensor. To this end a sampling tube 44 leads from the second dilution chamber 34 to a light scattering sensor 45 adapted to measure the particle size and particle size distribution of the particulate solids over a range of 0.1 to 0.9 microns. As pointed out above read-outs from the light scattering sensor may be noted visually and used to make the appropriate adjustments manually in a computer 46 designed to automatically actuate plant operational controls. However the invention also contemplates transferring these readings automatically to the computer 46 by means of an electronic inter-face 47, whereby the plant operational controls are automatically actuated to maintain continuous production of pigmentary $TiO_2$ of optimum pigmentary properties.

The following description further illustrates the invention as used to control the pigmentary properties of vapor phase $TiO_2$ pigment produced by one burner in a multiple-burner chloride plant. The concentration of particulate solids in the reaction product gases flowing downwardly through the reactor duct 10 was about $10^{19}$ particles per cu. ft. gas. The $TiO_2$ burdened reaction product gas was continuously sampled by feeding filtered nitrogen into feed pipe 14 at the rate of 20 SCFM and unfiltered nitrogen into the feed pipe 15 at the rate of 40 SCFM whereby a cloud of nitrogen was maintained around the inner end of the sampling probe. The sampling probe 13 had an O.D. of one-eighth inches and the I.D. of the orifice 28 in the probe 13 was 0.0625 inches. Unfiltered nitrogen was supplied to the pressure sensing tube 16 at the rate of 1.8 SCFM. The dimensions of the first dilution chamber 20 was such that its volume was 4 cu. inches and unfiltered nitrogen was fed into the chamber 20 via feed pipe 30 at the rate of 20 SCFM. The vacuum pump 20 was operated at a steady rate and the setting of the differential pressure transducer 17 was such that the pressure in chamber 20 was about 9 inches $H_2O$ negative the pressure differential between the chamber 20 and the duct 10 being about 2 whereby a partially dilute sample of the $TiO_2$ burdened reaction product gas was withdrawn continuously from duct 10 via the nitrogen cloud therein into the dilution chamber 20. The second dilution chamber 34 had an internal volume of 4 cu. in. and filtered nitrogen was fed into it via pipe 36 at the rate of 10 SCFM. The feed pipe 33 connecting the first dilution chamber with the second dilution chamber had an orifice 35, 0.05 inches in diameter and the setting of the differential pressure transducer 39 was such that the pressure in the chamber 34 was 9.05 inches of water negative. The pressure differential between the first and second dilution chambers was thus about 0.05 inches water negative whereby a twice diluted sample of the particulate burdened gas from chamber 34 was drawn continuously into dilution chamber 34. Throughout the sampling operation pressure variations in the duct 10 were automatically compensated for by the differential pressure transducers, whereby the sample gas withdrawn from the duct 10 was diluted at a substantially steady rate. The original gas sample was thus diluted by a factor of about $10^{12}$ and was then fed directly into a light scattering sensor which analyzed the particle size and particle size distribution of the particulate $TiO_2$ of the thrice-diluted sample over a range of from 0.1 to 0.9 microns.

The run was continued for about one and one half hours during which time the read-outs of the light scattering sensor were recorded every minute. Typical read-outs were as follows:

LIGHT SCATTERING SENSOR

| Channel No. | 1 | 2 | 3 | 4 |
|---|---|---|---|---|
| Particle Size Range(Microns) | 0.15–0.25 | 0.25–0.35 | 0.35–0.45 | 0.45–0.55 |

READ-OUTS

| Time Period | No. Percent of Particles | | | |
|---|---|---|---|---|
| 142606–144336 (17 minutes 30 seconds) | 65.1 | 17.3 | 10.6 | 3.5 |
| | 62.8 | 16.1 | 12.3 | 4.3 |
| | 61.2 | 18.7 | 11.1 | 5.0 |
| | 61.3 | 15.9 | 11.2 | 5.6 |
| | 57.5 | 18.0 | 11.5 | 5.7 |
| | 58.6 | 16.1 | 11.3 | 5.5 |
| | 68.1 | 16.3 | 8.2 | 2.8 |
| | 73.1 | 14.7 | 7.2 | 2.2 |
| | 71.8 | 12.0 | 8.3 | 2.7 |
| | 71.8 | 12.0 | 8.3 | 2.7 |
| | 60.6 | 18.9 | 11.8 | 4.1 |
| | 60.1 | 14.8 | 14.1 | 4.7 |
| | 49.7 | 22.8 | 15.1 | 5.5 |
| 150234–161329 (1 hour 11 minutes 35 seconds) | 56.4 | 21.7 | 14.1 | 4.0 |
| | 59.3 | 17.7 | 13.2 | 5.0 |
| | 54.2 | 23.3 | 13.0 | 5.5 |
| | 54.2 | 22.1 | 13.5 | 5.5 |
| | 54.5 | 22.9 | 14.0 | 4.1 |
| | 57.9 | 16.3 | 16.0 | 4.3 |

LIGHT SCATTERING SENSOR

| Channel No. | 5 | 6 | 7 | 8 |
|---|---|---|---|---|
| Particle Size Range(Microns) | 0.55–0.65 | 0.65–0.75 | 0.75–0.85 | 0.85–0.95 |

READ-OUTS

| Time Period | No. Percent of Particles | | | |
|---|---|---|---|---|
| 142606–144336 (17 minutes 30 seconds) | 1.1 | 1.1 | 0.30 | 0.4 |
| | 1.9 | 1.4 | 0.80 | 0.0 |
| | 1.2 | 1.1 | 0.90 | 0.3 |
| | 2.0 | 2.2 | 0.80 | 0.7 |
| | 2.6 | 2.3 | 1.2 | 0.8 |
| | 2.6 | 3.5 | 1.3 | 0.7 |
| | 1.9 | 1.3 | 0.4 | 0.6 |
| | 1.2 | 0.4 | 0.6 | 0.2 |
| | 2.0 | 1.4 | 0.9 | 0.3 |
| | 2.0 | 1.4 | 0.9 | 0.3 |
| | 2.1 | 1.2 | 0.4 | 0.3 |
| | 2.5 | 1.4 | 1.4 | 0.6 |
| | 3.6 | 1.5 | 0.9 | 0.4 |
| | 1.0 | 1.4 | 0.7 | 0.2 |
| 150234–161329 (1 hour 10 minutes 95 seconds) | 2.2 | 1.0 | 1.0 | 0.2 |
| | 1.0 | 0.9 | 1.1 | 0.5 |
| | 1.6 | 1.6 | 0.4 | 0.6 |
| | 1.8 | 1.3 | 0.9 | 0.0 |
| | 2.6 | 1.4 | 0.7 | 0.4 |

The particle size and particle size distribution recorded in the above read-outs were relatively uniform. Moreover when it is understood that pigmentary $TiO_2$ of optimum optical properties has a particle size within the range of 0.15–0.25 microns with a major portion of the particles in this size range and a rapidly decreasing number of particles in the larger particle size ranges it will be apparent at once from the above read-outs that the pigment being produced was of optimum quality.

As an indication of the sensitivity of the particle size and particle size distribution measuring means of this invention one or more of the plant operational controls was altered automatically by making manual adjustments in the computer. These alterations produced changes in the quality of the pigment and were reflected by changes in the read-out of the light scattering sensor within a matter of a few minutes. As a consequence readjustment of the plant controls could be made soon enough to avoid production of any large quantity of inferior pigment.

Thus the invention provides an accurate, reliable and sensitive method and means for measuring the particle size and particle size distribution of particulate solids in a solids burdened gas and in particularly well-suited for monitoring the continuous production of vapor phase $TiO_2$ pigment in a manner to insure optimum pigmentary properties over an extended period of time.

While this invention has been described and illustrated by the examples shown, it is not intended to be strictly limited thereto, and other variations and modifications may be employed within the scope of the following claims.

I claim:

1. Method for diluting a particulate solids-laden gas by an order of magnitude of at least about $10^{12}$ comprising: passing said solids-laden gas through a conduit having an outlet in the wall thereof, introducing an inert gas into said conduit via said outlet to form and maintain a shroud of inert gaseous diluent within said conduit around said outlet, withdrawing a sample of said solids-laden gas from said conduit through said shroud of inert gas therein to effect first-order dilution of said gas, and subjecting said first-order diluted gas to progressively higher orders of dilution by mixing said first-order diluted gas successively with relatively large volumes of an inert gaseous diluent.

2. Method for diluting a particulate solids-laden gas according to claim 1 wherein said first-order diluted gas is subjected to progressively higher orders of dilution by mixing said first-order diluted gas with a relatively large volume of inert gaseous diluent to effect a second-order diluted gas, taking a sample of said second-order diluted gas and mixing said sample with a relatively large volume of inert gaseous diluent to effect third-order diluted gas and repeating the aforesaid sampling and diluting steps until a sample having the desired dilution is achieved.

3. Method for measuring the particle size and particle size distribution of particulate solids in a solids-laden gas passing through a conduit having an outlet in the wall thereof comprising: diluting said solids-laden gas by an order of magnitude of at least about $10^{12}$ by successively introducing an inert gas into said conduit via said outlet to form and maintain a shroud of an inert gaseous diluent within said conduit around the outlet thereof, withdrawing a sample of said solids-laden gas from said conduit through said shroud of inert gas therein to effect first-order dilution of said sample, continuously subjecting the first-order diluted gas to progressively higher orders of dilution and then feeding the resulting highly dilute sample of gas to particle size and particle size distribution measuring means.

4. Method for measuring the particle size and particle size distribution of particulate solids in a solids-laden gas according to claim 3 wherein the first-order diluted gas is subjected to progressively higher orders of dilution by mixing said first-order diluted gas with a relatively large volume of inert gaseous diluent to effect second-order dilution, taking a sample of said second-order diluted gas and mixing said sample with a relatively large volume of inert gaseous diluent to effect third-order diluted gas and repeating the aforesaid sampling and diluting steps until a sample having the desired dilution is achieved prior to feeding the diluted gas to said particle size and particle size distribution measuring means.

5. Method for continuously measuring particle size and particle size distribution of particulate solids in a solids-laden gas passing through a conduit having an outlet in the wall thereof comprising: diluting said solids-laden gas by an order of magnitude of at least about $10^{12}$ by successively introducing an inert gas into said conduit via said outlet to form and maintain a shroud of inert gaseous diluent within said conduit around the outlet thereof, effecting a first order dilution of said solids-laden gas by withdrawing a sample of said solids-laden gas from said conduit through said shroud of inert gas therein said sample being withdrawn from said conduit into a first dilution chamber by maintaining a negative pressure differential between said conduit and said first dilution chamber, and continuously subjecting said first-order diluted gas to progressively higher orders of dilution by mixing said first-order diluted gas with a relatively large volume of inert gaseous diluent in said first dilution chamber to produce a second-order diluted gas sample in said first dilution chamber, continuously drawing a sample of said second-order diluted gas into a second dilution chamber and mixing said second-order diluted gas with a relatively large volume of inert gaseous diluent in said second dilution chamber to produce third-order dilution of said sample therein and feeding a sample of said third-order diluted gas to particle size and particle size distribution monitoring means.

6. Method for continuously measuring particle size and particle size distribution of particulate solids in a solids-laden gas according to claim 5 wherein negative pressure differentials are maintained between said conduit and said first dilution chamber and between the latter and said second dilution chamber, respectively, for continuously withdrawing said first-order diluted gas through said first and second dilution chambers, respectively.

7. Method for continuously measuring particle size and particle size distribution of particulate solids in a solids-laden gas according to claim 6 wherein the negative pressure differentials between said conduit and said first dilution chamber and between the latter and said second dilution chamber, respectively, are maintained substantially constant irrespective of fluctuations in pressure of the solids-laden gas in said conduit by continuously monitoring the pressure in said conduit, adjusting the negative pressure differential in said first dilution chamber in response thereto and adjusting the negative pressure differential in said second dilution chamber in response to the negative pressure differential in said first dilution chamber.

8. Method for continuously measuring particle size and particle size distribution of particulate solids in a solids-laden gas according to claim 5 wherein said solids-laden gas is the reaction product gases of a vapor phase process for producing a particulate metal oxide.

9. In a continuous process for producing vapor phase $TiO_2$ wherein vaporous $TiCl_4$ is reacted with a free oxygen containing gas at temperature above 800° C to produce a reaction product gas containing about $3 \times 10^{17}$ solid particulate $TiO_2$ per cubic foot gas and wherein the operational controls of the several components entering into said reaction are automatically monitored by computer-means for producing a uniform product the improvement comprising: diluting a sample of the reaction product gas by an order of magnitude of at least about $10^{12}$ in accordance with the method of claim 1, feeding the diluted gas sample into particle size and particle size distribution measuring means for continuously measuring the particle size and particle size distribution of the particulate $TiO_2$ in said reaction product gas and utilizing the read-out of said measuring means for adjusting the controls of said computer-means.

10. A system for diluting a particulate solids-laden gas by an order of magnitude of at least about $10^{12}$, said system comprising a conduit through which said particulate solids-laden gas flows, a gas sampling probe, a gas diluting chamber having an entrance end and a discharge end, one end of said gas sampling probe being arranged to project into said conduit at right angles to the flow of gas therethrough for removing a gas sample therefrom, the opposite end of said probe being arranged to engage in the entrance end of said diluting chamber, tubular means arranged to project into said conduit in spaced concentric relationship to said sampling probe, means arranged to feed an inert gaseous diluent into said tubular means to provide a shroud of inert gas around the adjacent end of said sampling probe, vacuum means connected to the discharge end of said dilution chamber and arranged to create a pressure differential between said conduit and said dilution chamber whereby a sample of said particulate solids-laden gas is withdrawn from said conduit through said shroud of inert gas and said probe into said dilution chamber and from thence out the discharge end thereof to effect first-order dilution of said sample, valve-means arranged between the discharge end of said dilution chamber and said vacuum means for regulating the flow velocity of the gas sample escaping from the discharge end of said dilution chamber, pressure differential stabilizing means comprising means arranged to monitor the pressure in said conduit and in said dilution chamber respectively, and servo-motor means arranged to respond to the output of said stabilizing means and to automatically actuate said valve-means thereby to vary the flow velocity of said gas sample through said dilution chamber and hence vary the pressure therein to compensate for variations in pressure in said conduit; feed-means arranged to feed a gaseous diluent into said dilution chamber for effecting second-order dilution of the gas sample therein and a second sampling probe, said second sampling probe being arranged to project into said dilution chamber substantially at right angles to the flow of the dilute gas sample therethrough for removing a sample of said second-order dilute gas therefrom.

11. A system for diluting a particulate solids-laden gas according to claim 10 wherein said pressure differential stabilizing means comprises a differential pressure transducer connected to said conduit and to said dilution chamber respectively, said servo-motor means being connected to said transducer and arranged to actuate said valve means in response thereto.

12. A system for diluting a particulate solids-laden gas according to claim 10 wherein said second sampling probe is connected to the entrance end of a second dilution chamber the discharge end of which is connected to said vacuum means whereby a pressure differential is created between said first dilution chamber and said second dilution chamber for effecting withdrawal of a sample of said second-order dilute gas from said first dilution chamber into said second dilution chamber, and from thence out the discharge end thereof, feed-means arranged to feed an inert gaseous diluent into said second dilution chamber for effecting third-order dilution of the gas sample therein and a third sampling probe, said third sampling probe being arranged to project into said second dilution chamber substantially at right angles to the flow of the third-order dilute gas sample therethrough for removing a sample of said third-order dilute gas therefrom.

13. A system for diluting a particulate solids-laden gas according to claim 12 wherein valve-means is arranged between the discharge end of said second dilution chamber and said vacuum means for regulating the flow velocity of the third-order dilute gas sample therethrough and means for stabilizing the pressure differential between said first dilution chamber and said second dilution chamber comprising means arranged to monitor the pressure in said first dilution chamber and in said second dilution chamber, respectively, and servo-motor means arranged to respond to the output of said stabilizing means and to automatically actuate the valve-means of said second dilution chamber thereby to vary the flow velocity of the third-order dilute gas sample through said second dilution chamber and hence vary the pressure therein to compensate for variations in pressure in said first dilution chamber.

14. A system for diluting a particulate solids-laden gas according to claim 13 wherein said pressure differential stabilizing means comprises a differential pressure transducer connected to said first dilution chamber and to said second dilution chamber, respectively, said servo-motor means being connected to said transducer and arranged to actuate the valve means of said second dilution chamber.

15. In a system for producing vapor phase $TiO_2$ wherein vaporous $TiCl_4$ is reacted with free oxygen containing gas at temperature above 800° C to produce a reaction product gas containing at least about $10^{12}$ solid particulate $TiO_2$ per cubic foot of gas and wherein the operational controls of the several components entering into said reaction are automatically monitored by computer-means for producing a uniform product, the improvement comprising: the gas diluting system of claim 12, measuring means connected to the second sampling probe of the gas diluting system of claim 12 and arranged to measure the particle size and particle size distribution of the $TiO_2$ particles in said second-order dilute gas sample and means arranged to superimpose the output of said measuring means on said computer-means for automatically controlling the several components entering into said reaction in a manner to insure production of $TiO_2$ particles having said optimum particle size and particle size distribution.

* * * * *